US007003553B2

(12) United States Patent
Kanai et al.

(10) Patent No.: US 7,003,553 B2
(45) Date of Patent: Feb. 21, 2006

(54) STORAGE CONTROL SYSTEM WITH CHANNEL CONTROL DEVICE HAVING DATA STORAGE MEMORY AND TRANSFER DESTINATION CIRCUIT WHICH TRANSFERS DATA FOR ACCESSING TARGET CACHE AREA WITHOUT PASSING THROUGH DATA STORAGE MEMORY

(75) Inventors: Hiroki Kanai, Odawara (JP); Junichi Iida, Odawara (JP)

(73) Assignee: Hitachi, Ltd., Tokyo (JP)

( * ) Notice: Subject to any disclaimer, the term of this patent is extended or adjusted under 35 U.S.C. 154(b) by 22 days.

(21) Appl. No.: 10/857,908

(22) Filed: Jun. 2, 2004

(65) Prior Publication Data

US 2005/0223166 A1   Oct. 6, 2005

(30) Foreign Application Priority Data

Apr. 5, 2004  (JP) .............................. 2004-111096

(51) Int. Cl.
*G06F 12/00* (2006.01)
*G06F 13/00* (2006.01)

(52) U.S. Cl. ...................... 709/212; 709/217; 711/113; 711/118; 711/154; 710/36; 726/26

(58) Field of Classification Search ................ 711/112, 711/113, 114, 154, 158; 709/212, 217; 710/5, 710/22, 36, 308
See application file for complete search history.

(56) References Cited

U.S. PATENT DOCUMENTS

| 5,724,542 | A | 3/1998 | Taroda et al. |
|---|---|---|---|
| 6,311,252 | B1 | 10/2001 | Raz |
| 6,496,934 | B1 * | 12/2002 | Suzuki et al. ................. 726/27 |
| 6,535,518 | B1 * | 3/2003 | Hu et al. .................... 370/401 |
| 6,810,462 | B1 * | 10/2004 | Matsunami et al. ........ 711/112 |
| 6,850,955 | B1 * | 2/2005 | Sonoda et al. .............. 707/200 |
| 2003/0084237 | A1 | 5/2003 | Yoshida et al. |
| 2004/0123028 | A1 | 6/2004 | Kanai et al. |
| 2005/0177641 | A1 * | 8/2005 | Yamagami .................. 709/229 |
| 2005/0210028 | A1 * | 9/2005 | Kodama ........................ 707/9 |

FOREIGN PATENT DOCUMENTS

EP       1315074 A2 *  5/2003
JP    2003-316713       4/2002

* cited by examiner

*Primary Examiner*—Hong Kim
(74) *Attorney, Agent, or Firm*—Reed Smith LLP; Stanley P. Fisher, Esq.; Juan Carlos A. Marquez, Esq.

(57) ABSTRACT

A CHN comprises NAS memory capable of storing data received from a host terminal, and a transfer destination decision circuit. When an access request is received from the host terminal, if the access request is a data access request entailing data transfer performed between the host terminal and a cache area, and if a cache address associated with a file system address included in the data access request is identified, the transfer destination decision circuit transfers the data for reading in the cache area indicated by the cache address directly to the host terminal without passing through the NAS memory, or transfers data for writing included in the access request to the cache area without passing through the NAS memory.

7 Claims, 10 Drawing Sheets

FIG. 4

| ASSOCIATIVE REGISTER ID | USAGE STATE DATA |
|---|---|
| 1 | 1 |
| 2 | 0 |
| 3 | 1 |
| ⋮ | ⋮ |

820

FIG. 8(a)
FIG. 8(b)
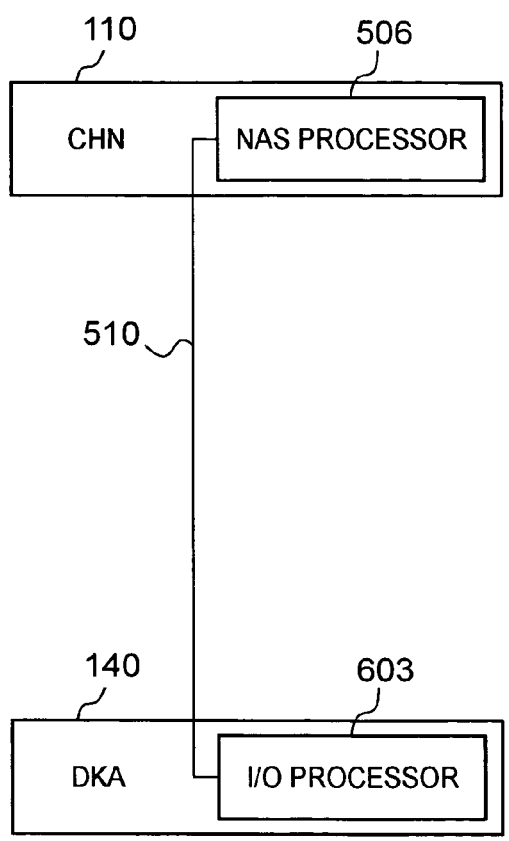
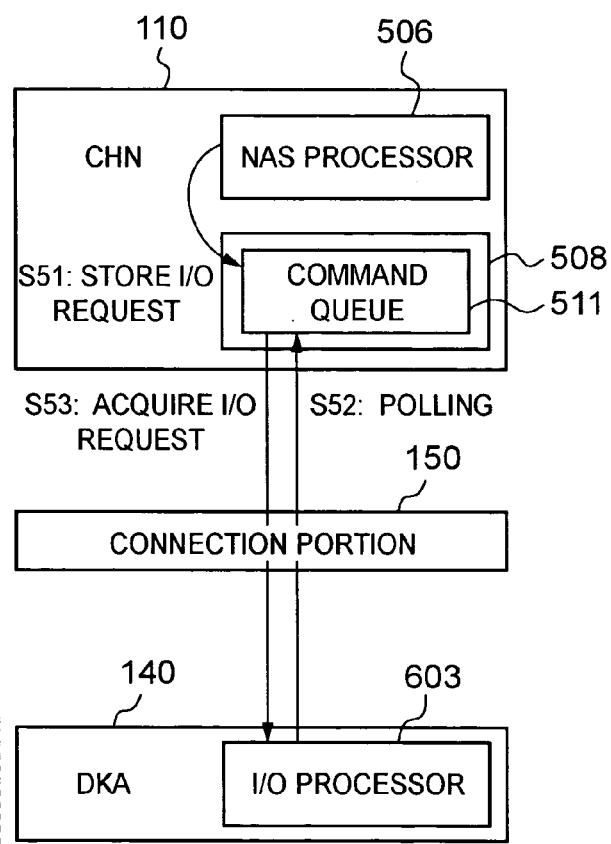

STORAGE CONTROL SYSTEM WITH
CHANNEL CONTROL DEVICE HAVING
DATA STORAGE MEMORY AND TRANSFER
DESTINATION CIRCUIT WHICH
TRANSFERS DATA FOR ACCESSING
TARGET CACHE AREA WITHOUT PASSING
THROUGH DATA STORAGE MEMORY

CROSS-REFERENCE TO PRIOR APPLICATION

This application relates to and claims priority from Japanese Patent Application No. 2004-111096, filed on Apr. 5, 2004, the entire disclosure of which is incorporated herein by reference.

BACKGROUND OF THE INVENTION

1. Field of the Invention

This invention relates to a technique for data transfer between a host device and a slave device, for example, to a storage control system such as a RAID system, and to a channel control device which can be installed in such a storage control system.

2. Description of the Related Art

In for example a database system such as a data center which handles large volumes of data, a storage control system, provided separately from the host computer, manages data. This storage control system is for example a disk array system such as a RAID (Redundant Array of Independent Inexpensive Disks) system, in which numerous storage devices are arranged in an array.

As has for example been disclosed in Japanese Patent Laid-open No. 2003-316713, such a storage control system, by comprising network channel adapters (hereafter "CHN") to process I/O requests in file units, can become a NAS (Network Area Storage) system. Further, this storage control system comprises disks, disk adapters (DKAs), and cache memory which stores data shared by CHNs and DKAs and recorded on disks.

According to the above patent publication, a CHN is provided with memory, and a data buffer used for file data caching and similar exists in this memory. Hence data transfer between a NAS client and cache memory is performed via the data buffer in this memory. If the speed of this data transfer can be increased, greater convenience can be expected to result.

SUMMARY OF THE INVENTION

Hence an object of this invention is to increase the speed of data transfer between a host device and a slave device.

Further objects of this invention will become clear in the following explanations.

A storage control system according to a first perspective of this invention comprises a storage device which stores data; cache memory, having a cache area in which is stored data exchanged between an external device and the above storage device; a channel control portion, which receives data from an external device and stores data in the above cache area, and which reads the data stored in the above cache area and transfers the data to the above external device; and a storage device control portion, which reads data stored in the above cache area and stores the data in the above storage device, and stores data read from the above storage device in the above cache area. The channel control portion comprises data storage memory, capable of storing data received from the external device; associative memory, which stores a file system address, which is a file-level address of data in a data file, and a cache address associated with the file system address; and a transfer destination decision circuit. When an access request received from the external device is a file access request having a file system address, if the cache address associated with the file system address included in the file access request is identified by the associative memory, the transfer destination decision circuit transfer the data to be accessed within a target cache area which is the cache area indicated by the identified cache address to the external device, without passing through the data storage memory, or transfers the data for accessing in the file access request to the target cache area, without passing through the data storage memory.

In a first aspect of a storage control system according to the first perspective of the invention, the above channel control portion comprises a first processor which converts the above file system address into a block level address, which is the unit for management of the storage area of the above storage device. At least one among the channel control portion and storage device control portion comprises a second processor which secures the above cache area in the cache memory, based on a converted block level address. Prior to issuing the file access request, the first processor receives a preceding command from the external device, writes the file system address to be accessed to the associative memory in response to the prior command, and converts the file system address until the block level address. Based on the block level address converted by the first processor, the second processor secures the cache area and writes a cache address indicating the secured cache area to the associative memory to which the file system address has been written.

In a second aspect of a storage control system according to a second perspective of the invention, the above channel control portion comprises, on the side toward the external device relative to the transfer destination decision circuit, an IP circuit which interprets the Internet protocol for an access request received from the external device, and a TCP circuit which interprets the transmission control protocol for an access request received from the external device. By this means, an access request from the external device, passing through the IP circuit and the TCP circuit, is input to the transfer destination decision circuit.

In a third aspect of a storage control system according to the first perspective of the invention, the above associative memory comprises a plurality of registers. Each of the plurality of registers stores one file system address included in one file access request, and one or a plurality of cache addresses associated with the file system address.

A channel control device according to the second perspective of this invention is the above channel control device installed in a storage control system comprising a storage device which stores data; cache memory having a cache area in which is stored data exchanged between an external device and the above storage device; a channel control device which receives data from the external device and stores the data in the cache area, and which reads data stored in the cache area and transfers the data to the external device; and a storage device control portion which reads data stored in the cache area and stores the data in the storage device, and which stores data read from the storage device in the cache area. The channel control device comprises data storage memory capable of storing data received from the external device, and a transfer destination decision circuit. Upon receiving an access request from the external device, if the access request is an access request entailing data transfer to be performed between the external device and the cache area, and if the cache address associated with an information element included in the data access request is identified, the transfer destination decision circuit transfers the data to be accessed in a target cache area, which is the cache area indicated by the identified cache address, to the external device without passing through the data storage memory, or transfers the data to be accessed included in the access request to the target cache area without passing through the data storage memory.

In the first aspect of a channel control device according to the second perspective of this invention, the channel control device further comprises associative memory which stores a file system address, which is a file level address of data in a data file, and a cache address associated with the file system address. Here, when an access request received from the external device is a file access request having a file system address, if the cache address associated with the file system address included in the file access request is identified from the associative memory, the above transfer destination decision circuit transfer the data to be accessed in a target cache area, which is the cache area indicated by the identified cache address, to the above external device without passing through the data storage memory, or transfers data to be accessed in the file access request to the target cache area without passing through the data storage memory.

A data transfer device according to a third perspective of this invention is a data transfer device which can be mounted in a communication device, and comprises a transfer destination decision circuit. When an access request received from an external device existing at a higher level than the data transfer device is a data access request entailing data transfer between the external device and a storage area of a slave storage device existing at a lower level than the data transfer device, and if a storage address associated with an information element included in the data access request is identified, the transfer destination decision circuit transfers the data to be accessed within a target storage area, which is the storage area indicated by the identified storage address, to the external device without passing through the data storage memory within the communication device, or transfers data to be accessed included in the access request to the target storage area without passing through the data storage memory.

The data transfer method according to a fourth perspective of this invention has a first step and a second step. In the first step of the data transfer method, an access request is received from a host device (an external device). In the second step of the data transfer method, if the received access request is an access request entailing data transfer between the host device and a storage area of a slave device, and the storage address associated with an information element included in the data access request is identified, then the data to be accessed within the target storage area, which is the storage area indicated by the identified storage address, is transferred to the external device without passing through the data storage memory in the communication device, or, data to be accessed included in the access request is transferred to the target storage area without passing through the data storage memory.

BRIEF DESCRIPTION OF THE DRAWINGS

FIG. 4 shows an example of the configuration of an associative register management table 820;

FIGS. 8(a) and (b) show an example of data communication between a CHN 110 and DKA 140 in a second modified example of the aspect;

DESCRIPTION OF THE PREFERRED EMBODIMENTS

Figure 1:
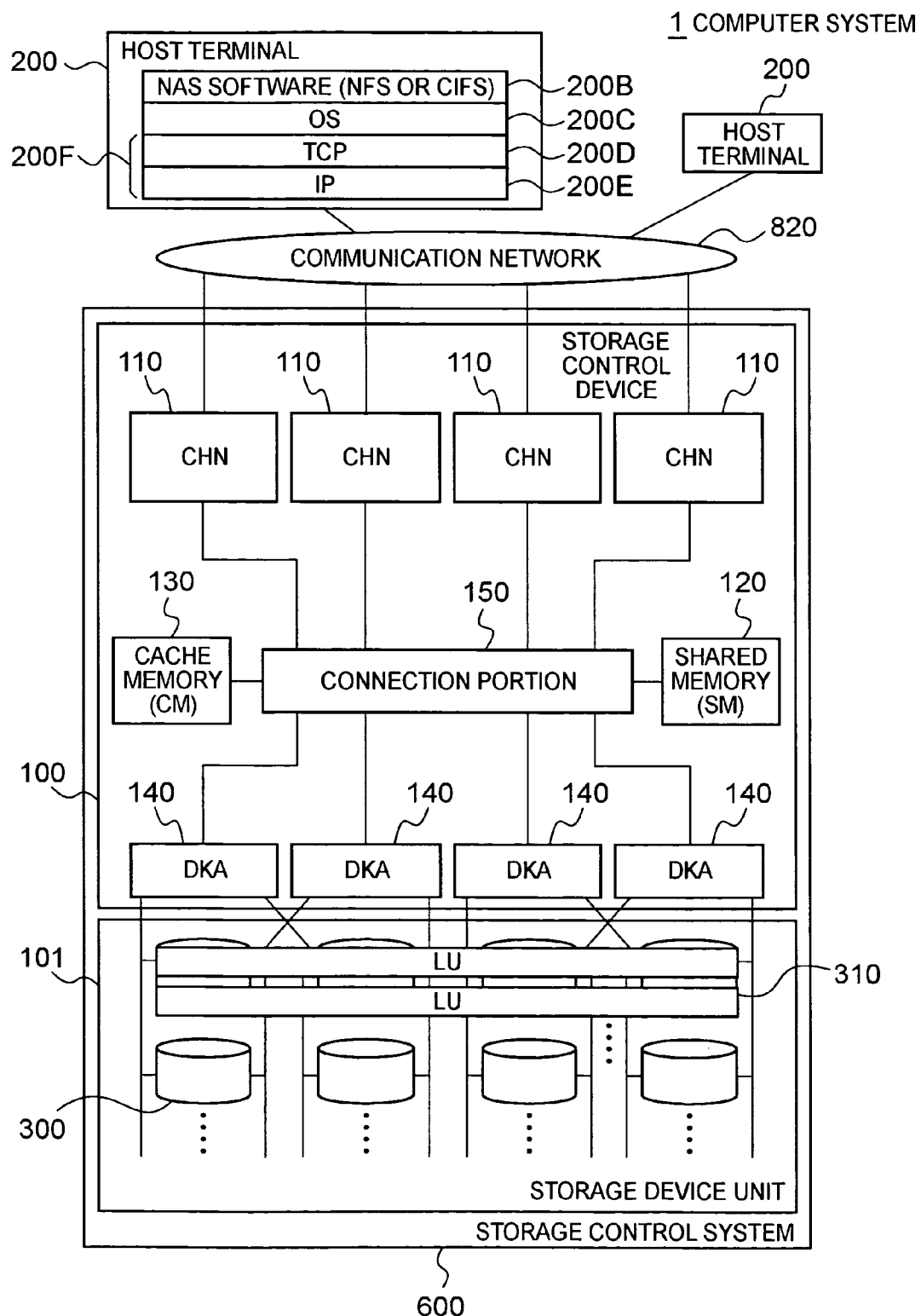
FIG. 1 is a block diagram showing a computer system comprising a storage control system of one aspect of the invention.

Below, an aspect of the invention is explained, referring to the drawings.

FIG. 1 is a block diagram showing the configuration of a computer system comprising a storage control system of this aspect of the invention.

In this computer system 1, one or more host terminals 200 and a storage control system 600 are connected to the communication network 820. The communication network 820 is a communication network for exchange of file level data; for example, a LAN, the Internet, a dedicated circuit, or public circuits may be used as appropriate.

Each of the one or more host terminals is for example a computer device comprising a CPU (Central Processing Unit), memory, and other information processing resources, and may be configured as for example a personal computer, workstation, mainframe or similar. A host terminal 200 comprises for example a keyboard switch and pointing device, microphone or other data input devices (not shown), as well as a display monitor, speakers or other data output devices (not shown). Further, a host terminal 200 comprises, for example, NAS usage software 200B to use NAS, Windows (a registered trademark), UNIX (a registered trademark) or other OS (operating system) 200C, and a network driver 200F. A host terminal 200 issues requests to the storage control system 600 for data input/output in file units, for example specifying a file name. As the NAS usage software 200B, for example, when the OS 200C is UNIX (a registered trademark), NFS (Network File System) may be used, and when the OS 200C is Windows (a registered trademark), CIFS (Common Interface File System) may be used. The network driver 200F comprises, for example, a TCP driver 200D to perform data processing based on TCP (Transmission Control Protocol) and an IP driver 200E to perform data processing based on IP (Internet Protocol).

The storage control system 600 is for example a RAID system comprising numerous physical storage devices 300 arranged in an array. Storage control systems 600 can be broadly divided into storage control devices 100 and storage device units 101. Storage control devices 100 comprise, for example, a plurality of channel adapters NAS (hereafter abbreviated "CHN") 110, a plurality of disk adapters (hereafter "DKA") 140, cache memory 130, shared memory 120, and a connection portion 150.

A CHN 110 performs data communication with a host terminal 200. A CHN 110 is for example configured as a microcomputer system comprising a CPU, memory and similar, and interprets and executes various commands received from a host terminal 200. A network address (for example, IP address or WWN) is allocated to a CHN 110 for use in identification. The CHN 110 receives a file-unit I/O request (for example, a command comprising a file name and an instruction to read or write the file with this file name; hereafter called a "file I/O request") from a host terminal 200 via the communication network 820, and can behave as NAS (Network Attached Storage) to process the file I/O request. The CHN 110 stores data received from a host terminal 200 in cache memory 130, and also acquires data stored in cache memory by a DKA 140 and transmits the data to a host terminal 200.

The DKA 140 exchanges data with a logical storage unit (hereafter "LU") 310 within the storage device unit 101. The DKA 140 comprises a communication port, not shown, for connection to a physical storage device 300 comprising the LU 310. The DKA 140 is configured as a microcomputer system comprising a CPU, memory and similar. The DKA 140 acquires data written by a CHN 110 to cache memory 130 and writes the data to the LU 310, or stores data read from the LU 310 in cache memory 130. During data input/output with the LU 310, the DKA 140 converts logical addresses into physical addresses.

The cache memory (hereafter sometimes abbreviated "CM") 130 is for example volatile or non-volatile memory, which temporarily stores data received from a host terminal 200 for writing to a LU 310 and data read from a LU 310 which is to be transferred to a host terminal 200.

The shared memory (hereafter sometimes abbreviated "SM") 120 is for example non-volatile memory, which stores control information (for example, information indicating which data is to be stored in which cache area secured in the CM 130) relating to data exchanged with a host terminal, and similar. A work area (for example, an area in which messages exchanged between a CHN 110 and DKA 140 and the CPU are stored) is for example set in the shared memory 120. In the example shown, the CM 130 and SM 120 are physically separate, but these may be portions of the same memory. In this case, the memory space in the memory may be logically divided into a CM space and an SM space.

The connection portion 150 interconnects each of the CHNs 110, each of the DKAs 140, the cache memory 130, and the shared memory 120. The connection portion 150 can for example be configured as an ultra-high speed crossbar switch or other high-speed bus which performs data transfer by high-speed switching operation.

The storage device unit 101 comprises a plurality of physical storage devices 300 arranged in an array. As physical storage devices 300, for example, hard disks, flexible disks, magnetic tapes, semiconductor memory units, optical discs, or other devices can be used. A plurality of logical units (hereafter abbreviated "LUs") 310, which are logical storage devices, are included in the storage area of a physical storage device 300.

Below, the aspect is explained in further detail. In the explanation, it is assumed that the NAS software 200B is NFS.

Figure 2:
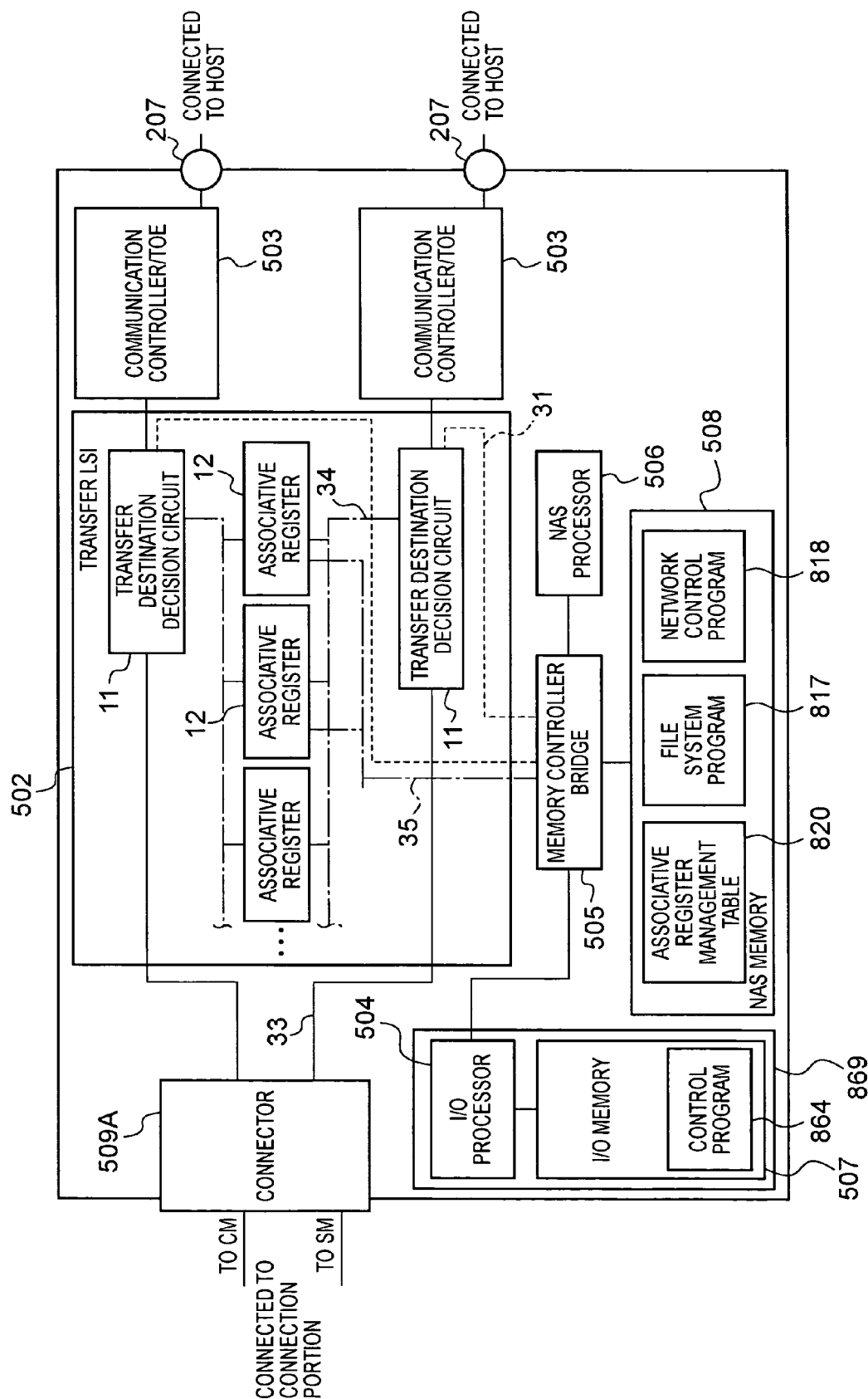
FIG. 2 is a block diagram showing an example of the configuration of a CHN 110.

FIG. 2 is a block diagram showing an example of the configuration of a CHN 110.

A CHN 110 comprises one (or a plurality of) input/output control portion 869, in turn comprising a plurality of (or one) communication ports 207, two or more (or one) communication controller/TOEs 503, an I/O processor 504, and I/O memory 507; a memory controller bridge 505, a NAS processor 506; NAS memory 508; a connector 509; and a transfer LSI 502.

The communication controller/TOEs 503 are hardware circuits combining a communication controller and TOE (TCP/IP offload engine), and are connected to a communication port 207 and to the transfer LSI 502. The communication controller is for example a LAN controller, and performs data processing based on the IP. The TOE performs data processing based on the TCP. The communication controller and TOE may be physically separated.

The memory controller bridge 505 is connected to the NAS processor 506, NAS memory 508, I/O processor 504, and transfer LSI 502, and is a LSI (Large-Scale Integrated circuit) which relays communications therebetween. The memory controller bridge 505 is connected to a memory bridge transfer bus 31 and processor register bus 35, described below.

The NAS memory 508 can store a program which governs control of the NAS processor 506. The NAS memory 508 can store, for example, a file system program 817, network control program 818, associative register management table 820, and similar. The file system program 817 for example manages the association of file names included in file I/O requests with address information (for example, the LUN and leading logical block address) of the location at which the file having that file name is stored; based on this association, the file I/O request is converted into a block I/O request. The network control program 818 comprises for example two file system protocols, NFS (Network File System) and Samba. NFS accepts file I/O requests from a host terminal equipped with the UNIX (a registered trademark) operating system, on which NFS runs. On the other hand, Samba accepts file I/O requests from a host terminal equipped with the Windows (a registered trademark) operating system, on which CIFS (Common Interface File System) runs. A plurality of register IDs associated with a plurality of associative registers 12, and a plurality of usage state data items, are registered in the associative register management table 820.

The NAS processor 506 is for example a CPU or microprocessor, and is connected to the memory controller bridge 505. The NAS processor 506 can read the file system program 817 and network control program 818 and similar stored in the NAS memory 508, and can execute processing according to computer programs which have been read. For example, the NAS processor 506 accepts file I/O requests from a host terminal 200 by means of the network control program 818. And, the NAS processor 506 can convert into a block I/O request a file I/O request received from a host terminal 200 and stored in NAS memory 508, and can output the block I/O request to the I/O processor 504, by means of the file system program 817 (a block is a unit of data management in a storage area on a LU 310). When an access request entailing data transfer is output from a host terminal 200, prior to this the NAS processor 506 receives a prescribed preceding command from the host terminal 200. In this case, the NAS processor 506 registers the file system address in an associative register 12 selected from among the plurality of associative registers 12, through the memory controller bridge 505 and processor register bus 35. Also, the NAS processor 506 notifies the I/O processor 504 of the register ID of the above selected associative register 12.

The I/O processor 504 is for example a CPU or microprocessor, and can exchange data with the connection portion 150, relay communication data between the NAS processor 506 and connection portion 150, manage cache addresses in the cache memory 130 and similar by means of the control program 864 read from the I/O memory 507. Further, the I/O processor 504 can secure a cache area in the cache memory 130 in response to a block I/O request from the NAS processor 506, and can register a cache address indicating the secured cache area in the associative register 12 corresponding to the register ID transmitted from the NAS processor 506 via the memory controller bridge 505 and processor register bus 35.

The I/O memory 507 stores a computer program covering control of the I/O processor 504 and similar.

The connector 509 is connected to the connection portion 150. Specifically, the connector 509 is for example connected to a CM transfer path (transfer path connected to the CM 130) and SM transfer path (transfer path connected to the SM 120) included in the connection portion 150. However, a CM transfer path and SM transfer path need not necessarily coexist in one connector 509. For example, in place of the connector 509, a first connector connected to the CM transfer path and a second connector connected to the SM transfer path may be provided.

The transfer LSI 502 is an LSI (Large-Scale Integrated circuit) to enable communication between for example the communication controller/TOE 503, memory controller bridge 505, cache memory 130, and shared memory 120. The transfer LSI 502 comprises a plurality of (or one) associative registers 12, and one or more (for example, the same number as the number of communication controller/TOEs 503) transfer destination decision circuits 11.

Each of the plurality of associative registers 12 is connected to a processor register bus 35, through which data exchanged between the associative register 12 and processor 504 or 506 passes, and a decision register bus 34, described below. File system addresses, and cache addresses associated with the file system addresses, are registered in each of the plurality of associative registers 12. The number of associative registers 12 comprised by the transfer LSI 502 is for example the same as the number of accesses from host terminals 200 which can be simultaneously received by a CHN 110.

A transfer destination decision circuit 11 is for example a pure hardware circuit. A transfer destination decision circuit 11 is connected to, for example, a decision register bus 34 serving as the access path for a plurality of associative registers 12, a connector transfer bus 33 through which data exchanged with the cache memory 130 and shared memory 120 via the connector 590 passes, and a memory bridge transfer bus 35 through which data exchanged with the memory controller bridge 505 passes. The transfer destination decision circuit 11 judges whether an access request, received for example from a host terminal 200 via a communication controller/TOE 503, is an access request entailing data transfer; if, as a result of this decision, the access request entails data transfer, and if an access destination cache address can be identified in at least one among the plurality of associative registers 12, then data transfer is performed directly, without passing through NAS memory 508, with the identified access destination cache address. Specifically, when for example the transfer destination decision circuit 11 receives a read request (for example, "NFSPROC_READ") from a host terminal 200 via a communication controller/TOE 503, if there exists an associative register 12 which stores a file system address included in the read request, then data for reading is read, via the connector transfer bus 33, from the cache area indicated by the cache address stored in that associative register 12, and this data for reading is transferred directly to the host device 200 via the communication controller/TOE 503, without passing through NAS memory 508. And when for example the transfer destination decision circuit 11 receives a write request (for example, "NFSPROC_WRITE") from a host terminal 200 via a communication controller/TOE 503, if there exists an associative register 12 which stores a file system address included in the write request, then the data for writing in this write request is transferred directly via the connector transfer bus 33 to the cache area indicated by the cache address stored in that associative register 12, without passing through NAS memory 508.

The above is an example of the configuration of a CHN 110. The above-described processor register bus 35, decision register bus 34 and memory bridge transfer bus 31 are logical buses. Each of the component elements in the transfer LSI 502 and the memory controller bridge 505 are connected together by a PCI bus or other single physical bus (not shown) (and similarly in FIG. 7 below also).

Figure 3:
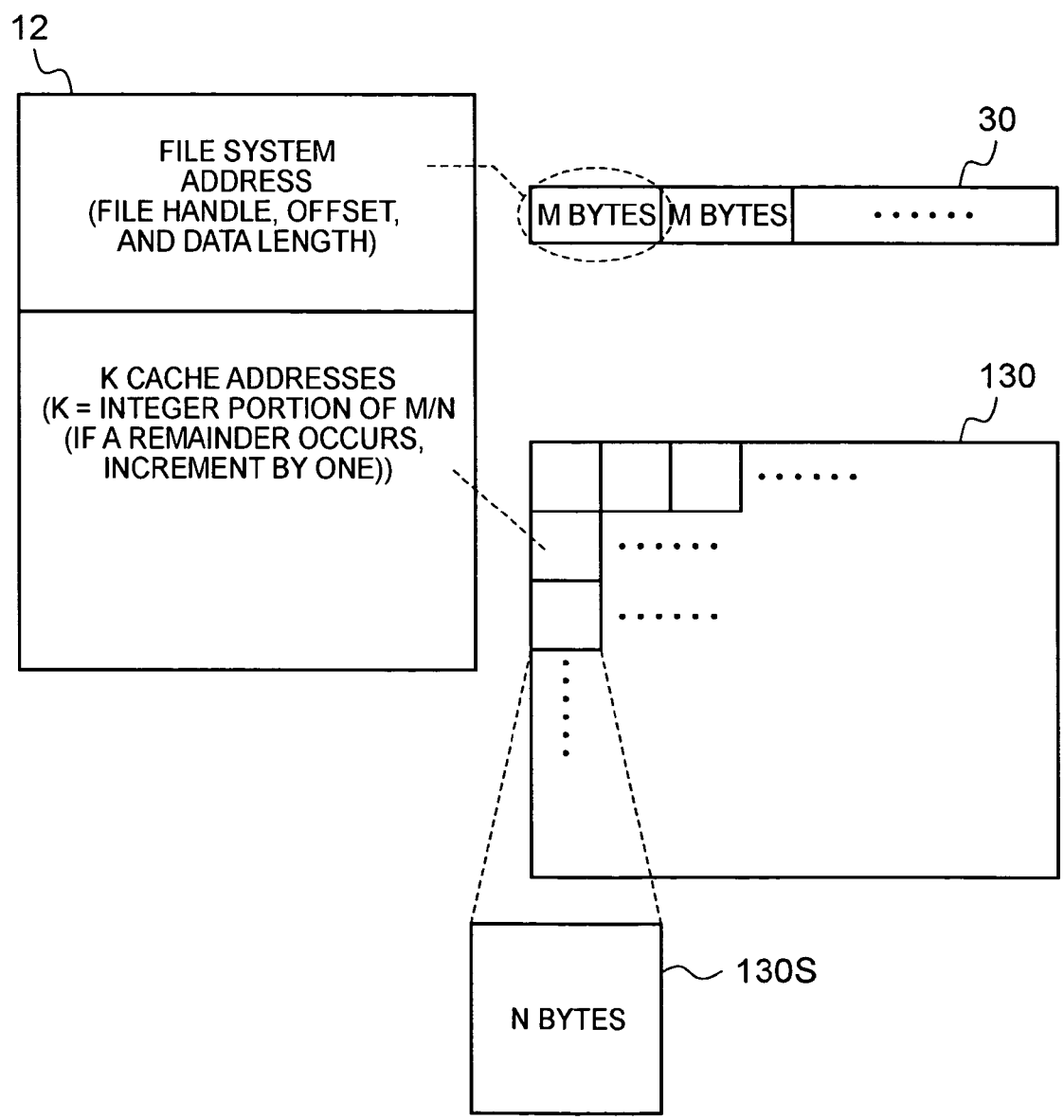
FIG. 3 shows an example of the configuration of an associative register 12.

FIG. 3 shows an example of the configuration of an associative register 12.

As shown in FIG. 3, a file system address output from the NFS 200B of a host terminal 200 and one or a plurality of cache addresses associated with the file system address are registered in an associative register 12.

A file system address is information relating to the address of a data file for accessing (for example, a user file input to or output from a LU 310 by a host terminal 200), and may be, for example, information indicating from which location in a data file for accessing, and to what length, the data extends. Specifically, a file system address may for example comprise a file handle, an offset, and a data length. The file handle indicates for example the leading address of the data file to be accessed. The offset is the offset from the file handle, and more specifically, indicates the leading address for actual accessing in the data file to be accessed. The data length is the data length from the above offset in the data file to be accessed; for example, as shown in FIG. 3, when a data file 30 is accessed in M byte units (is either written or read), the data length is indicated by M.

The one or a plurality of cache addresses are addresses indicating storage areas in the cache memory 130, and for example indicate storage areas of the data size for writing to or reading from cache memory based on one file system address. Specifically, when for example cache memory 130 is managed in units of cache blocks 130S, one cache address indicates one cache block 130S, and a number K (K≧1) of cache addresses are registered for one file system address. More specifically, when for example a data file 30 is accessed in M byte units (for example, 4096 byte units), if the size of the area of each cache block in cache memory 130 is N bytes (for example, 512 bytes), then the number K of cache addresses is the value of the quotient of M/N (for example, 4096/512=8). When a remainder occurs, the value of the quotient may be increased by one.

FIG. 4 shows an example of the configuration of an associative register management table 820.

A plurality of register IDs corresponding to a plurality of associative registers 12, and a plurality of usage state data items, are registered in the associative register management table 820.

A register ID is identification information (for example, a number) for a corresponding associative register.

Usage state data is data indicating the state of use of the corresponding associative register, and is for example information indicating whether the register is in use (for example, a "1" when in use, and a "0" when not being used).

Below, an example of the flow of processing for data transfer in this aspect is explained.

Figure 5:
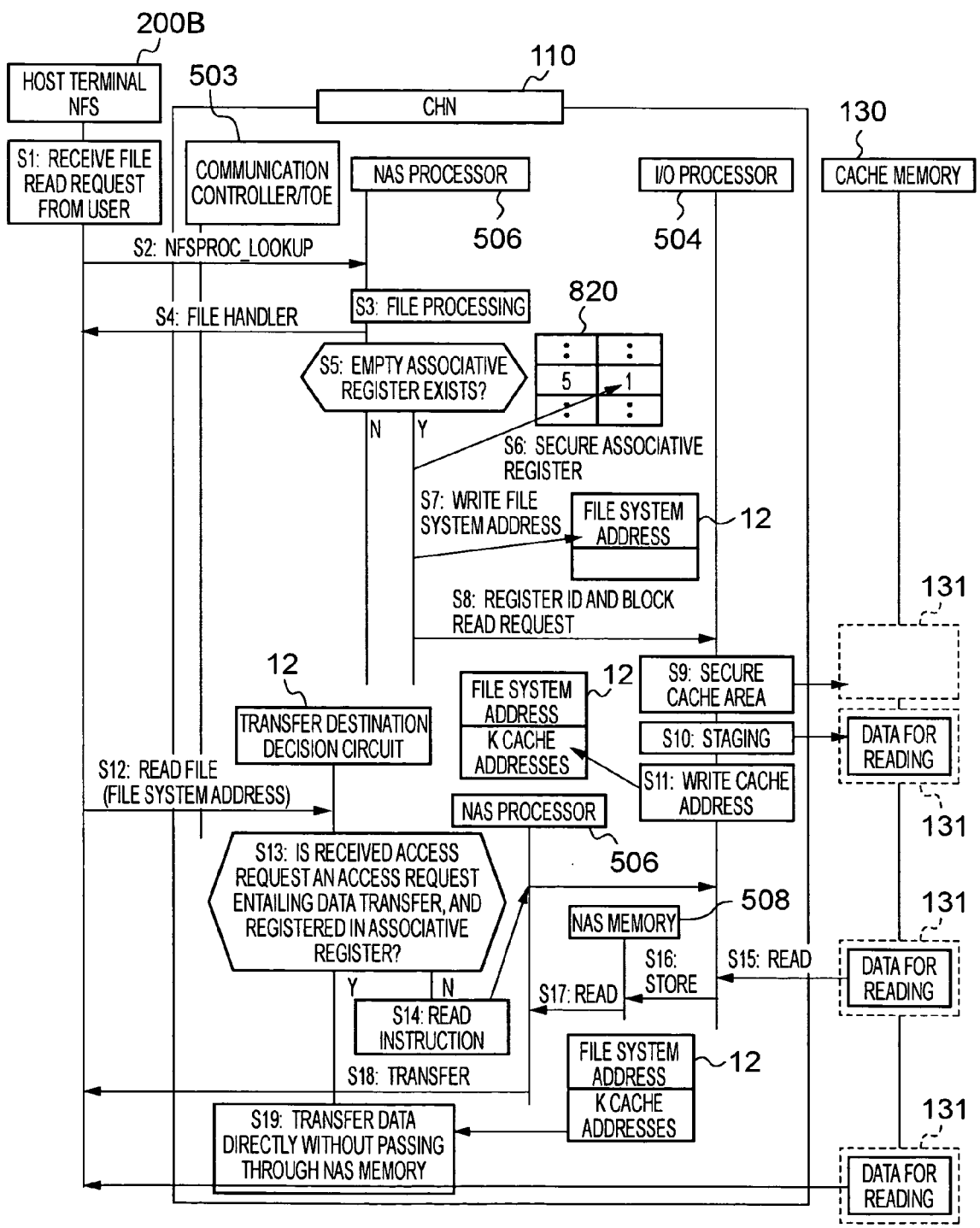
FIG. 5 shows the processing flow when a user at a host terminal 200 issues a file read request to the NFS 200B.

FIG. 5 shows the processing flow when a user at a host terminal 200 issues a file read request to the NFS 200B.

When the NFS 200B of a host terminal 200 receives a file read request from a user (step S1), a preceding command is transmitted requesting the location for accessing in order to acquire the data file having the requested file name. Specifically, for example, the NFS 200B of a host terminal 200 transmits a file handler request (for example, "NFSPROC_LOOKUP") (S2).

The NAS processor 506 performs file processing based on the file system program 817, according to the file handler request received from the NFS 200B of the host terminal 200 via the communication controller/TOE 503 (S3). The NAS processor 506 then transmits to the NFS 200B of the host terminal 200 the file handler acquired by this file processing (the file handler corresponding to the received file handler request) (S4).

The NAS processor 506 then searches the unused associative registers 12 among the plurality of associative registers 12 (S5). Specifically, the NAS processor 506 references the associative register management table 820 through the memory controller bridge 505, and searches for usage state data indicating unused registers among the plurality of usage state data items registered in the associative register management table 820.

In S5, when an unused associative register 12 is found ("Y" in S5), the NAS processor 506 secures the unused associative register 12 which has been found (S6). Specifically, the NAS processor 506 changes the usage status data in the associative register management table 820 corresponding to the associative register 12 which has been found from "unused" to "in use".

Also, when the result in S5 is "Y", the NAS processor 506 writes the file system address based on the above acquired file handler to the associative register 12 secured in S6, via the memory controller bridge 505 and processor register bus 35 (S7).

When the result in S5 is "Y", the NAS processor 506 converts the file system address based on the above acquired file handler into an address at the block level, which is the unit of management of storage area in a LU 310, and transmits to the I/O processor 504 a read request having this block level address (hereafter called a "block read request") and the register ID of the associative register 12 secured in S6 (S8).

Upon receiving a register ID and block read request, the I/O processor 504 secures in cache memory 130 a cache area 131 to store data (hereafter called data for reading) which is to be read according to the block read request, based on the block read request (S9). And by performing inter-processor communication with the I/O processor, not shown, on the DKA 140, the I/O processor 504 reads the data for reading from the location indicated by the address included in the received block read request (the location in the LU 310), and stores this data for reading in the above secured cache area 131 (S10).

Further, the I/O processor 504 writes K cache addresses indicating the secured cache area 131 to the associative register 12 corresponding to the above received register ID, via the memory controller bridge 505 and processor register bus 35 (S11).

When the NFS 200B of the host terminal 200 receives a file handler through the processing of S4, it transmits to the CHN 110 a file read request comprising a file system address based on the received file handler (S12).

The transfer destination decision circuit 11 of the CHN 110 receives the file read request comprising the file system address via the communication controller/TOE 503. The received file read request has already been subjected to data processing based on IP and TCP in the communication controller/TOE 503.

The transfer destination decision circuit 11 judges whether the received access request is an access request entailing data transfer to cache memory 130, and moreover whether the cache address corresponding to the access request is recorded in any of the plurality of associative registers 12 (S13). Specifically, the transfer destination decision circuit 11 judges whether for example a received access request is "NFSPROC_READ" or "NFSPROC_WRITE", and moreover whether the associative register 12 in which is stored the file system address included in the access request exists within the plurality of associative registers 12.

If a negative judgment result is obtained in S13, that is, if either (1) or (2) below is the case:

(1) the received access request is judged not an access request entailing data transfer to cache memory 130 (for example, is neither "NFSPROC_READ" nor "NFSPROC_WRITE"); or, (2) even though the received access request is an access request (for example "NFSPROC_READ") entailing data transfer to cache memory 130, no associative register 12 storing the file system address included in the received access request is discovered among the plurality of associative registers 12; then, the transfer destination decision circuit 11 outputs a data read instruction to the NAS processor 506. As a result, a block read request is output from the NAS processor 506 to the I/O processor 504. Upon receiving this block read request, the I/O processor 504 reads the data for reading for which staging is performed in cache memory 130 and stores the data in NAS memory 508 (S15 and S16), and the NAS processor 506 reads the data for reading stored in NAS memory 508 and transfers the data to the host terminal 200 (S17 and S18).

On the other hand, if in S13 a positive judgment result is obtained, that is, if the received access request is an access request (for example "NFSPROC_READ") entailing data transfer to cache memory 130, and moreover an associative register 12 storing the file system address included in the received access request is found among the plurality of associative registers 12, then the transfer destination decision circuit 11 performs direct data transfer processing. Specifically, the transfer destination decision circuit 11 acquires the K cache addresses stored in the associative register 12 thus found via the decision register bus 34, reads the data for accessing from the cache area 131 indicated by the K cache addresses thus acquired (for example, K cache blocks 130S) via the connector transfer bus 33, and transfers the data for reading thus read to the host terminal 200 via the communication controller/TOE 503, without passing through NAS memory 508 (S19).

The above is the processing flow for cases in which a user at a host terminal 200 issues a file read request to the NFS 200B. In this processing flow, the processing of S4 may be performed after S11. Also, the file system address included in the file read request of S12 may for example be stored in NAS memory 508 by the transfer destination decision circuit 11, or may be stored in I/O memory 507 by the I/O processor 504.

Figure 6:
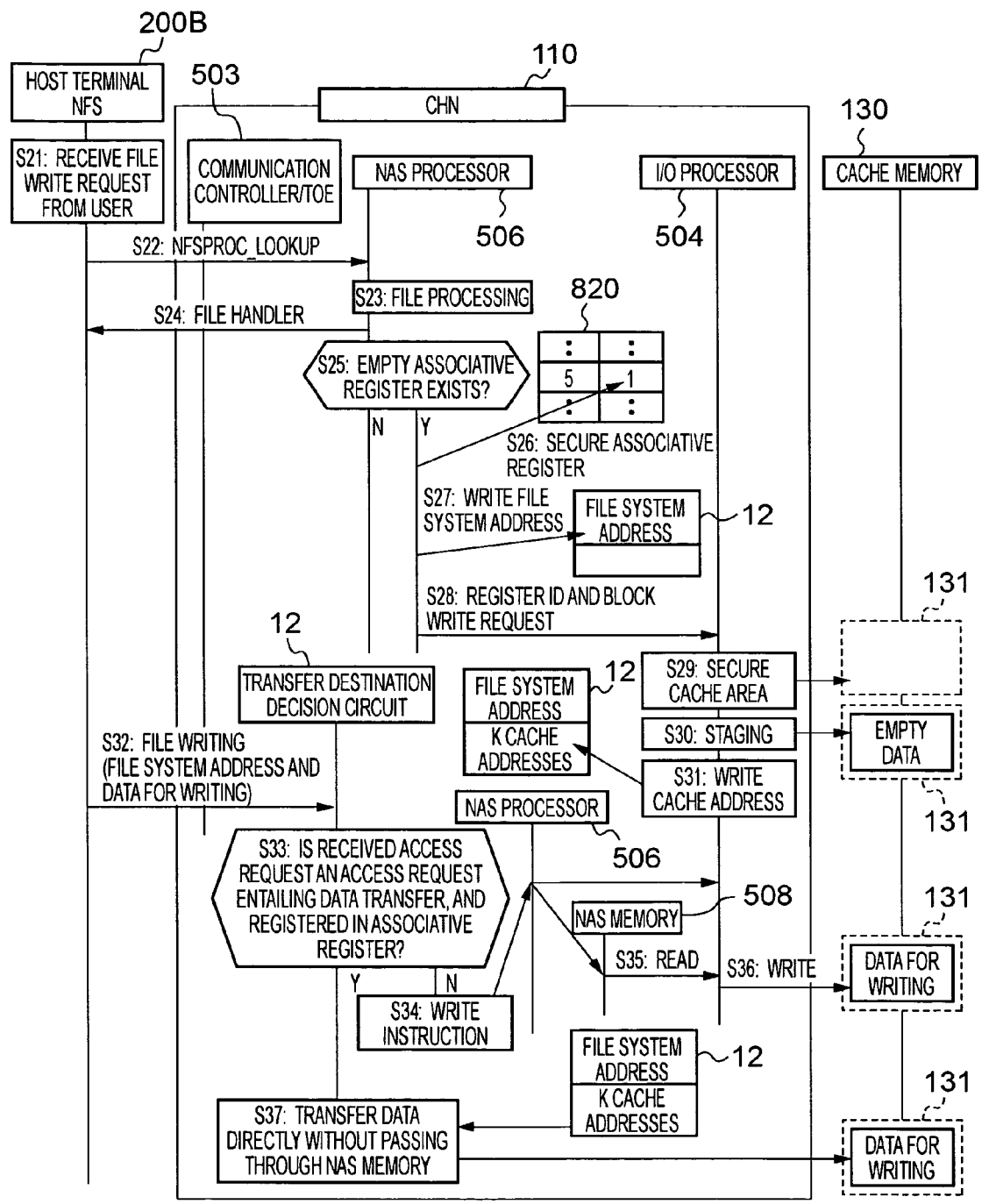
FIG. 6 shows the processing flow when a user at a host terminal 200 issues a file write request to the NFS 200B.

FIG. 6 shows the processing flow when a user at a host terminal 200 issues a file write request to the NFS 200B. In the following explanation, explanations of portions which duplicate portions explained with reference to FIG. 5 are either omitted, or are simplified.

When the NFS 200B of the host terminal 200 receives a file write request from a user (step S21), a file handler request is transmitted to request information indicating the location for writing of the data file having the file name of the request (S22).

The NAS processor 506 performs file processing according to the received file handler request (S23), and transmits the file handler acquired by this file processing to the NFS 200B of the host terminal 200 (S24).

Further, the NAS processor 506 searches for an unused associative register 12 among the plurality of associative registers 12 (S25).

In S25, if an unused associative register 12 is found ("Y" in S25), the NAS processor 506 secures the unused associative register 12 thus found (S26).

When the result in S25 is "Y", the NAS processor 506 writes the file system address based on the above acquired file handler to the associative register secured in S26, via the memory controller bridge 505 and processor register bus 35 (S27).

Also, when the result in S25 is "Y", the NAS processor 506 converts the file system address to a block level address based on the above acquired file handler, and transmits to the I/O processor 504 a write request (hereafter a "block write request") having this block level address, and the register ID of the associative register 12 secured in S26 (S28).

Upon receiving the register ID and block write request, the I/O processor 504 secures a cache area 131 in cache memory 130 to store the write data (hereafter "data for writing") according to the block write request, based on the block write request (S29). Then, by performing inter-processor communication with the I/O processor, not shown, in the DKA 140, the I/O processor 504 reads empty data (for example, data all bits of which are "0") from the location (in an LU 310) indicated by the address included in the received block write request, and stores this empty data in the above secured cache area 131 (S30). However, this processing in S30 need not be performed.

Further, the I/O processor 504 writes, to the associative register 12 corresponding to the above received register ID, the K cache addresses indicating the secured cache area 131, via the memory controller bridge 505 and processor register bus 35 (S31).

The NFS 200B of the host terminal 200, upon receiving a file handler through the processing of S24, transmits to the CHN 110 a file write request comprising a file system address based on the received file handler (S32).

The transfer destination decision circuit 11 of the CHN 110 receives the file write request, comprising the file system address and data for writing, via the communication controller/TOE 503. The transfer destination decision circuit 11 judges whether the received access request is an access request entailing data transfer to cache memory 130, and moreover whether a cache address corresponding to the access request is stored in any of the plurality of associative registers 12 (S33).

When in S33 a negative judgment result is obtained, the transfer destination decision circuit 11 outputs a data write instruction to the NAS processor 506 (S34). By this means the data for writing is written to NAS memory 508 by the NAS processor 506, and moreover a block write request is output from the NAS processor 506 to the I/O processor 504.

Upon receiving the block write request, the I/O processor 504 reads the data for writing which has been stored in NAS memory 508, and stores the data in the cache area 131 (S35 and S36).

When on the other hand a positive judgment result is obtained in S33, that is, when the received access request is an access request (for example "NFSPROC_WRITE") entailing data transfer to cache memory 130, and moreover an associative register 12 which stores the file system address included in the received access request has been found among the plurality of associative registers 12, the transfer destination decision circuit 11 performs direct data transfer processing. Specifically, the transfer destination decision circuit 11 acquires, via the decision register bus 34, the K cache addresses stored in the associative register 12 previously found, and transfers the data for writing via the connector transfer bus 33 to the cache area 131 indicated by the K cache addresses thus acquired (for example, K cache blocks 130S), without passing through NAS memory 508 (S37).

The above is the flow of processing performed when a user at a host terminal 200 issues a file write request to the NFS 200B. In this processing flow, the processing of S24 may be performed after S31. Also, the file system address included in the file write request of S32 may for example be stored in NAS memory 508 by the transfer destination decision circuit 11, or may be stored in I/O memory 507 by the I/O processor 504.

According to the above-described aspect, prior to issuing an access request entailing data transfer from a host terminal 200, a prescribed preceding command is issued from the host terminal 200. When the prescribed preceding command is detected in the CHN 110, a cache area is secured for the data to be exchanged according to the access request, and in addition the cache address indicating this cache area is associated with the file system in an associative register 12. Further, the access request output from the host terminal 200 is processed based on TCP and IP by the TCP driver 200D and IP driver 200E of the host terminal 200, but the IP layer and TCP layer portions of the access request are interpreted by the communication controller/TOE 503, so that the access request received by the transfer destination decision circuit 11 is the same as an access request output by NAS software (for example, NFS) 200B. By these means, when an access request which actually entails data transfer is issued from a host terminal 200, the data to be exchanged according to the access request is exchanged directly between the host terminal 200 and cache memory 130, without passing through memory in the CHN 110, based on the file system address included in the access request and a cache address associated therewith. As a result, data exchanges between a host terminal 200 and cache memory 130 can be performed more rapidly. This is expected to be particularly advantageous when data for writing which is output from the host terminal 200 is transferred to cache memory 130. Also, the longer the data exchanged between the host terminal 200 and cache memory 130, the more advantageous is the result.

According to the above-described aspect, when the NAS processor 506 specifications enable conversion of a file level I/O request into a block level I/O request, and moreover the I/O processor 504 specifications enable management of cache memory 130 (for example, securing cache areas in cache memory 130), the above-described faster data exchange can be achieved without any change in these specifications.

However, a number of modifications to the above-described aspect are conceivable. Modified examples are described below.

(1) First Modified Example

Figure 7:
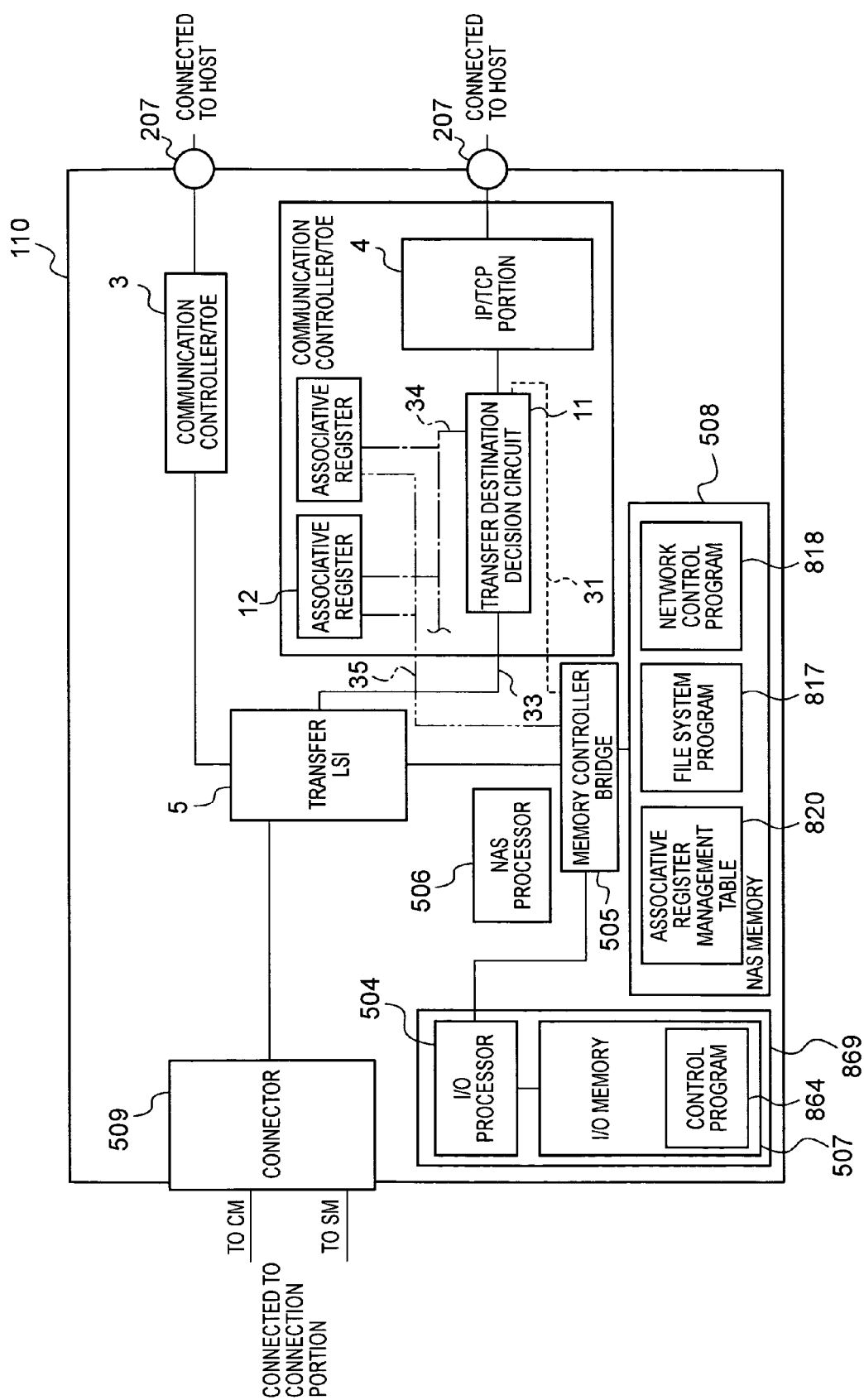
FIG. 7 shows an example of the configuration of a CHN 110 in a first modified example of the aspect.

FIG. 7 shows an example of the configuration of a CHN 110 in a first modified example of the aspect. In the following explanation, explanations of portions which duplicate portions explained in the above aspect are either omitted, or are simplified.

In the first modified example, the transfer destination decision circuit 11 is mounted in a communication controller/TOE 3. In the communication controller/TOE 3, the IP/TCP portion performing IP and TCP interpretation or processing is installed on a higher level than the transfer destination decision circuit 11 (that is, at a position on the host terminal side). This is in order that, when the communication controller/TOE 3 receives an access request, after IP and TCP interpretation the access request is received by the transfer destination decision circuit 11.

In this first modified example, similarly to the above-described aspect, the transfer destination decision circuit 11 can be connected to the memory bridge transfer bus 31 and decision register bus 34. Also, the transfer LSI 5 and transfer destination decision circuit 11 can be connected through the connector transfer bus 33. In this case, data for writing which for example is output by direct data transfer processing from the transfer destination decision circuit 11 is transferred to cache memory 130 via the connector transfer bus 33 and data transfer LSI 5.

(2) Second Modified Example

FIG. 8 shows an example of data communication between a CHN 110 and DKA 140 in a second modified example of the aspect.

In the second modified example, an I/O processor is not installed in the CHN 110, and the processing performed by the I/O processor 504 within the CHN 110 in the above aspect is performed by an I/O processor 603 in the DKA 140.

For example, as shown in (A) of FIG. 8, a dedicated interrupt line 510 is provided between the CHN 110 and DKA 140. In this case, a block level I/O request output from the NAS processor 506 is transmitted to the I/O processor 603 of the DKA 140 via the dedicated interrupt line 510. By this means the processing of for example S9 to S11 in FIG. 5 and S29 to S31 in FIG. 6 is performed by the I/O processor 603 of the DKA 140.

Also, as for example shown in (B) of FIG. 8, a command queue 511 is provided in the NAS memory 508 of the CHN 110. A block level I/O request output from the NAS processor 506 is stored in this command queue 511 (S51). The I/O processor 603 of the DKA 140 performs polling of the command queue (S52), and when the existence of an I/O request is detected, the I/O request is acquired from the command queue (S53).

(3) Third Modified Example

Figure 9:
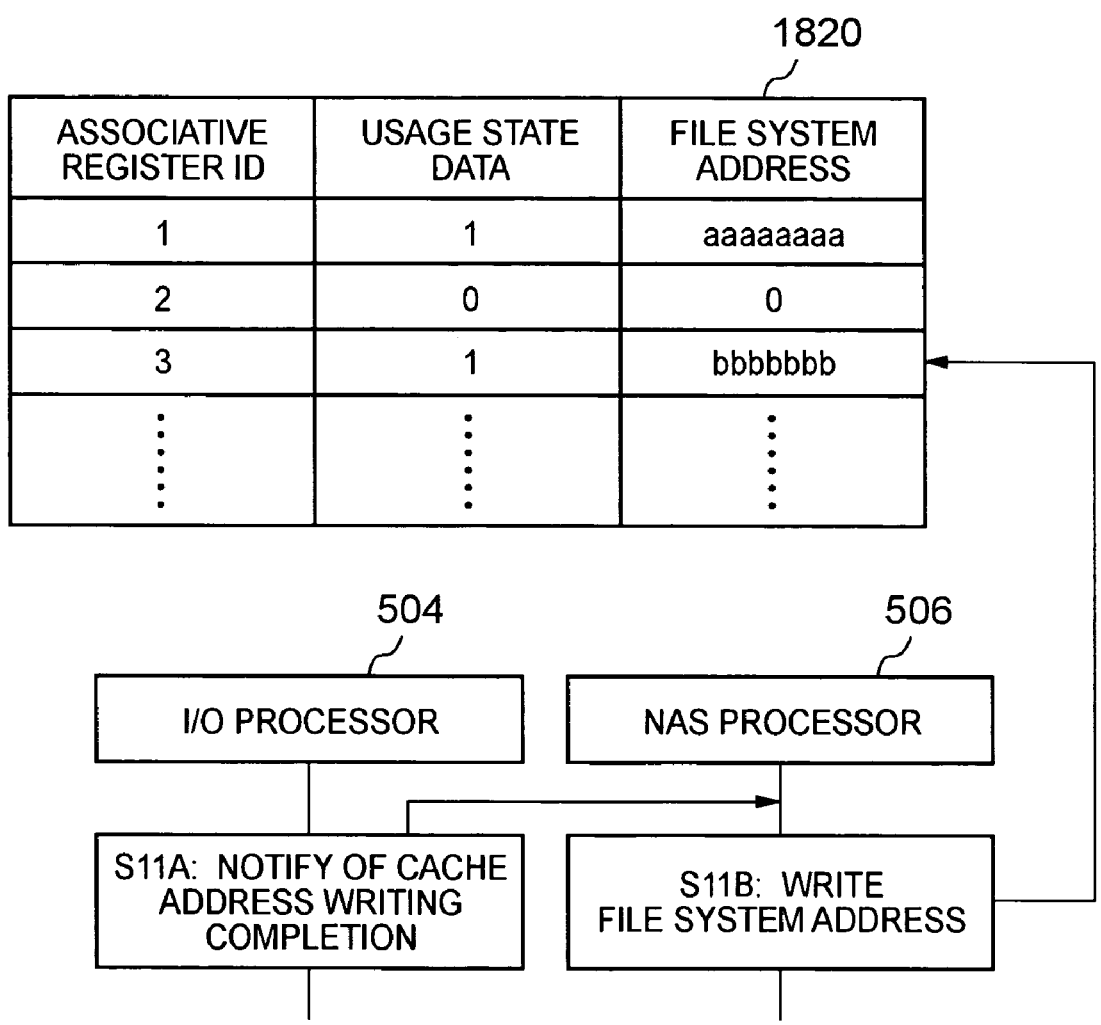
FIG. 9 shows an example of the configuration of an associative register management table 1820 in a third modified example of the aspect; and, FIGS. 10(a) and 10(b) show an example of the timing with which registration judgment processing is performed in the third modified example of the aspect.

FIG. 9 shows an example of the configuration of an associative register management table 1820 in a third modified example of the aspect.

An address registration area for file system addresses also exists in the associative register management table 820 for each associative register. A file system address for data to be read to an associative register is registered in the address registration area corresponding to the associative register.

For example, after S11 in FIG. 5, the I/O processor 504 notifies the NAS processor 506 of completion of cache address writing (S11A). Upon receiving this notification, the NAS processor 506 writes the file system address written in S7 to the address registration area of the associative register management table 820 corresponding to the associative register 12 secured in S6 (11B). By this means, it is possible to determine in which associative register 12 the cache address in the cache area 130 storing data corresponding to the file system address has been registered.

By performing this processing in advance, when a file handler is subsequently exchanged in response to a file handler request, it is possible to execute judgment (hereafter "registration judgment processing") as to whether there exists an associative register 12 in which is already registered a cache address corresponding to a file system address based on the file handler. The processing of S11B may for example be performed when performing S7.

Figure 10A:
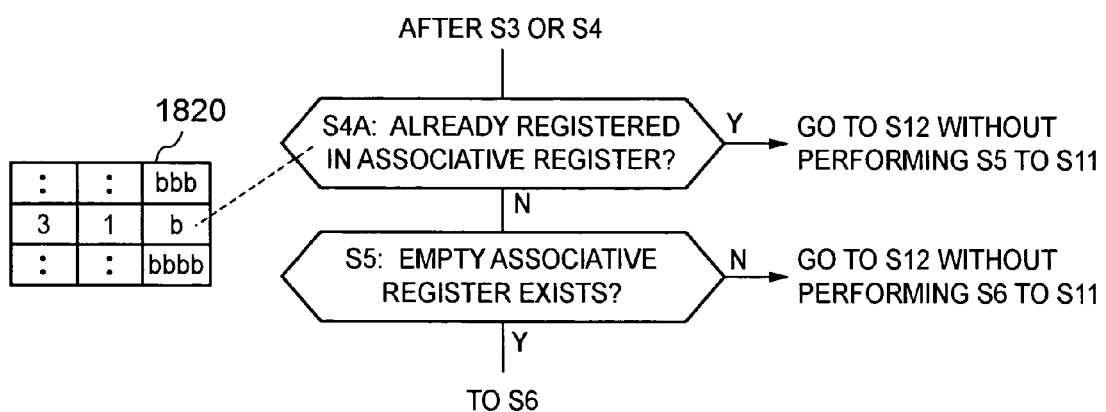
Figure 10B:
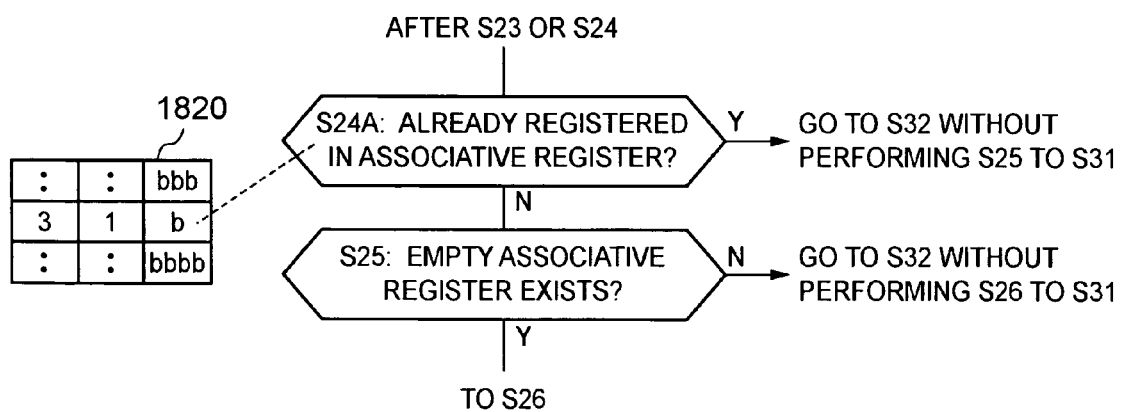

FIG. 10 shows an example of the timing with which registration judgment processing is performed in the third modified example of the aspect.

(A) in FIG. 10 is an example for the case of reading. That is, after S3 or S4 in FIG. 5, the NAS processor 506 executes registration judgment processing (S4A). Specifically, the NAS processor 506 judges whether or not there exists, in the associative register management table 1820, the same file system address as the file system address based on the acquired file handler. If as a result the same file system address is not found in the associative register management table 1820 ("N" in S4A), the above-described S5 is performed. If however in S4A the same file system address is found in the associative register management table 1820 ("Y" in S4A), S12 is executed, without performing S5 through S11.

(B) in FIG. 10 is an example of writing. That is, after for example S23 or S24 in FIG. 6, the NAS processor 506 executes registration judgment processing (S24A). If as a result the same file system address as the file system address based on the acquired file handler is not found in the associative register management table 1820 ("N" in S24A), the above-described S25 is performed. But if in S24A the above-described same file system address is found in the associative register management table 1820 ("Y" in S24A), S32 is executed, without performing S25 to S31.

There are cases in which the same file read request is issued continuously by a host terminal 200. And, there are cases in which data for writing included in a file write request issued from a host terminal 200 is the data read as a result of the issuance of a past file read request. In such cases, there already exists an associative register 12 in which is registered a cache address corresponding to the file system address included in the file read request or file write request as a result of the processing flow shown in FIG. 5. In such cases, the processing of S6 to S11 in FIG. 5 and of S26 to S31 in FIG. 6 is superfluous. By means of the above-described third modified example, this superfluous processing can be prevented.

In the above, an aspect and modified examples of the invention have been described; but these are illustrative examples used to explain the invention, and the scope of the invention is not limited to this aspect and these modified examples. This invention can be implemented in various forms. For example, the CHN 110 and DKA 140 may be fabricated integrally. Or, in place of the plurality of associative registers 12, for example, the same memory may be used to store the plurality of file system addresses and the K cache addresses associated with the plurality of file system addresses.

What is claimed is:

1. A storage control system, comprising:
   a storage device which stores data;
   cache memory having a cache area in which is stored data to be exchanged between an external device and said storage device;
   a channel control portion, which receives data from an external device and stores said data in said cache area, and which reads data stored in said cache area and transfers said data to said external device; and
   a storage device control portion, which reads data stored in said cache area and stores said data in said storage device, and which stores data read from said storage device in said cache area;
   wherein said channel control portion comprises:
   data storage memory, capable of storing data received from said external device;
   associative memory, which stores a file system address which is a file level address of data in a data file, and a cache address associated with said file system address; and
   a transfer destination decision circuit which, when an access request received from said external device is a file access request having a file system address, and if a cache address associated with the file system address included in said file access request is identified in said associative memory, transfers data for accessing in a target cache area which is the cache area indicated by said identified cache address to said external device without passing through said data storage memory, or transfers data for accessing in said file access request to said target cache area from said external device without passing through said data storage memory.

2. The storage control system according to claim 1, wherein
   said channel control portion further comprises a first processor which converts said file system address into an address at the level of block, which is the management unit of the storage area of said storage device;
   at least one among said channel control portion and said storage device control portion comprises a second processor, which secures said cache area in said cache memory based on said converted block level address;
   said first processor receives a preceding command from said external device prior to the issuance of said file access request, and in response to said preceding command, writes the file system address for accessing to said associative memory, and converts said file system address into said block level address; and
   said second processor secures said cache area based on said block level address converted by said first processor, and writes a cache address indicating said secured cache area to said associative memory to which has been written said file system address.

3. The storage control system according to claim 1, wherein said channel control portion comprises, on the side of said external device relative to said transfer destination decision circuit, an IP circuit which interprets the Internet protocol for an access request received from said external device, and a TCP circuit which interprets the transmission control protocol for an access request received from said external device, such that said access request from said external device, having passed through said IP circuit and said TCP circuit, is input to said transfer destination decision circuit.

4. The storage control system according to claim 1, wherein said associative memory comprises a plurality of registers, and each of said plurality of registers stores one file system address included in one file access request, and one or a plurality of cache addresses associated with the file system address.

5. A channel control device, installed in a storage control system comprising a storage device which stores data, cache memory having a cache area in which is stored data to be exchanged between an external device and said storage device, a channel control portion which receives data from an external device and stores said data in said cache area, and which reads data stored in said cache area and transfers said data to said external device, and a storage device control portion which reads data stored in said cache area and stores said data in said storage device, and which stores data read from said storage device in said cache area; comprising
   data storage memory, capable of storing data received from said external device; and,
   a transfer destination decision circuit which, when an access request is received from said external device, if said access request is a data access request entailing data transfer to be performed between said external device and said cache area, and if a cache address associated with an information element included in said data access request is identified, transfers data for accessing in a target cache area which is the cache area indicated by said identified cache address to said external device without passing through said data storage memory, or transfers data for accessing included in said access request to said target cache area from said external device without passing through said data storage memory.

6. The channel control device according to claim 5, further comprising associative memory, which stores a file system address which is a file level address of data in a data file and a cache address associated with said file system address,
   wherein said transfer destination decision circuit, when an access request received from said external device is a file access request having a file system address, and if a cache address associated with the file system address included in said file access request is identified in said associative memory, transfers data for accessing in the target cache area which is the cache area indicated by said identified cache address to said external device without passing through said data storage memory, or transfers data for accessing in said file access request to said target cache area without passing through said data storage memory.

7. A data transfer device, capable of being installed in a communication device, comprising a transfer destination decision circuit which, when an access request received from an external device existing at a higher level than said data transfer device is a data access request entailing data transfer to be performed between said external device and a storage area of a slave storage device existing at a lower level than said data transfer device, and if a storage address associated with an information element included in said data access request is identified, transfers data for accessing in a target cache storage area which is the storage area indicated by said identified storage address to said external device without passing through a data storage memory in said communication device, or transfers data for accessing included in said access request to said target cache storage area from said external device without passing through said data storage memory.

* * * * *